(12) United States Patent
Oh et al.

(10) Patent No.: US 8,217,623 B2
(45) Date of Patent: Jul. 10, 2012

(54) CHARGE EQUALIZATION APPARATUS AND METHOD

(75) Inventors: Jeon Keun Oh, Daejeon (KR); Joong Hui Lee, Daejeon (KR); Soo Yeup Jang, Daejeon (KR); Gun Woo Moon, Daejeon (KR); Chong Eun Kim, Daejeon (KR); Hong Sun Park, Daejeon (KR)

(73) Assignees: SK Energy Co. Ltd., Seoul (KR); Korea Advanced Institute of Science and Technology, Daejon (KR)

( * ) Notice: Subject to any disclaimer, the term of this patent is extended or adjusted under 35 U.S.C. 154(b) by 581 days.

(21) Appl. No.: 12/303,309

(22) PCT Filed: Jun. 13, 2007

(86) PCT No.: PCT/KR2007/002843
§ 371 (c)(1),
(2), (4) Date: Aug. 18, 2009

(87) PCT Pub. No.: WO2007/145464
PCT Pub. Date: Dec. 21, 2007

(65) Prior Publication Data
US 2009/0302803 A1    Dec. 10, 2009

(30) Foreign Application Priority Data

Jun. 15, 2006  (KR) .................. 10-2006-0054061

(51) Int. Cl.
*H02J 7/00* (2006.01)

(52) U.S. Cl. ..................................................... 320/118
(58) Field of Classification Search .................. 320/118, 320/119
See application file for complete search history.

(56) References Cited

U.S. PATENT DOCUMENTS

| | | | |
|---|---|---|---|
| 5,594,320 A | 1/1997 | Pacholok et al. | |
| 5,965,996 A | 10/1999 | Arledge et al. | |
| 6,121,751 A | 9/2000 | Merritt | |
| 6,538,414 B1 * | 3/2003 | Tsuruga et al. | 320/119 |
| 6,642,693 B2 * | 11/2003 | Anzawa et al. | 320/119 |
| 6,670,789 B2 * | 12/2003 | Anzawa et al. | 320/118 |
| 7,061,207 B2 * | 6/2006 | Patel et al. | 320/119 |
| 7,312,596 B2 * | 12/2007 | Bolz et al. | 320/120 |

* cited by examiner

*Primary Examiner* — Ramy Ramadan
(74) *Attorney, Agent, or Firm* — McDermott Will & Emery LLP

(57) ABSTRACT

The present invention relates, in general, to a battery voltage equalization apparatus and method, and, more particularly, to a charge equalization apparatus and method, which decrease the withstand voltages of semiconductor switching elements while maintaining charge equalization performance, thus making it easy to implement the secondary windings of transformers while reducing the costs of the charge equalization apparatus. The charge equalization apparatus includes N first transformers (T1 to Tn) connected in series with N series-connected batteries (B1 to Bn) and adapted to decrease voltages of overcharged batteries among the N batteries. A charge storage device (Cdump) stores energy supplied from the first transformers. A second transformer (TS) redistributes energy stored in the charge storage device to the N series-connected batteries. A voltage detection and drive signal generation unit (20) detects voltages of N respective series-connected batteries, and generates a first drive signal and a second drive signal.

26 Claims, 5 Drawing Sheets

CHARGE EQUALIZATION APPARATUS AND METHOD

CROSS-REFERENCE OF RELATED APPLICATIONS

This application is the US National Phase Application under 35 U.S.C. §371 of International Patent Application No. PCT/KR2007/002843 filed Jun. 13, 2007, which claims priority to and the benefit of Korean Patent Application No. 10-2006-0054061, filed Jun. 15, 2006, each of which are hereby incorporated by reference in their entireties. The International Application published as WO 2007/145464 on Dec. 21, 2007

TECHNICAL FIELD

The present invention relates, in general, to a battery voltage equalization apparatus and method, and, more particularly, to a charge equalization apparatus and method, which decrease the withstand voltages of semiconductor switching elements while maintaining charge equalization performance, thus making it easy to implement the secondary windings of transformers while reducing the costs of the charge equalization apparatus.

BACKGROUND ART

Many systems use batteries each formed of a battery pack or battery array, including a plurality of battery cells connected in series with each other.

When such battery cells are charged to voltages significantly higher than voltages within a rated charge range or discharged to voltages lower than voltages within a rated discharge range, they may be dangerous.

The imbalance between the charged states of battery cells is caused by various factors, and occurs during the manufacture of batteries or the charge/discharge of batteries. In the case of lithium ion cells, the manufacture of cells is strictly controlled in a factory to minimize the differences between the capacities of the cells of a battery array. However, imbalance or inequality between cells may occur due to various factors, regardless of the states of the cells, in which balance or equality was achieved in a factory after the cells were initially manufactured.

The factors influencing the imbalance of cells may include, for example, the chemical reactions, impedances and self-discharge rates of respective cells, the reduction of the capacities of the cells, variation in the operating temperatures of the cells, and different types of variation between the cells.

The inconsistency between the temperatures of cells is an important factor responsible for causing imbalance in cells. For example, "self-discharge" is caused in a battery cell, and is a function of battery temperature. A battery having a high temperature typically has a self-discharge rate higher than that of a battery having a low temperature. As a result, the battery having a high temperature exhibits a lower charged state than the battery having a low temperature over time.

Imbalance is a very series problem in the charged state of a battery. For example, the ability of a battery to supply energy is limited by a battery cell having the lowest charged state, which may typically occur in electric vehicles.

If the battery cell is fully consumed, other battery cells lose the ability to continue to supply energy. This is the same even if the other battery cells of the battery still have the ability to supply power. Therefore, an imbalance in the charged state of battery cells reduces the power supply ability of the battery.

Of course, the above description does not mean that, when one or more battery cells are consumed, the supply of power by the remaining battery cells is completely impossible. However, it means that, in the case of series connection, even if one or more battery cells are fully consumed, the battery can be continuously used as long as charge remains in the remaining battery cells, but, in that case, voltage having a reversed polarity is generated in the battery cell for which discharge has been completed, with the result that the battery cell may be in danger of explosion due to the overheating thereof or the generation of gas, and thus the battery loses power supply ability.

Various methods of correcting the imbalance between the charged states of battery cells have been proposed, and one of the methods is shown in FIG. 1.

FIG. 1 is a diagram showing a conventional charge equalization apparatus.

Referring to FIG. 1, the conventional charge equalization apparatus includes transformers T1 to Tn, switches SW1 to SWn, diodes D1 to Dn, and a voltage detection and drive signal generation unit 10. Then, dots on a primary winding and on a secondary winding in the transformers are located at opposite sides. Accordingly, each transformer is operated such that, when the primary winding is turned on, energy is charged in the primary winding, whereas, when the secondary winding is turned off and the primary winding is turned off, the energy charged in the primary winding is supplied to the secondary winding by a counter electromotive force, and thus the secondary winding is turned on.

The switches SW1 to SWn are connected in series with the primary windings of the transformers T1 to Tn, respectively, and are adapted to supply energy charged in overcharged batteries to the primary windings of the transformers T1 to Tn in response to a control signal provided by the voltage detection and drive signal generation unit 10. Accordingly, the overcharged batteries are discharged.

When the switches SW1 to SWn, connected in series with the primary windings, are turned on, the transformers T1 to Tn are supplied with energy by overcharged batteries, and charge the energy in the primary windings thereof. When the switches SW1 to SWn are turned off, the transformers supply energy, charged in the primary windings, to the secondary windings thereof by counter electromotive force.

The diodes D1 to Dn are connected in series with the secondary windings, respectively, and are adapted to rectify energy supplied from the secondary windings to the series-connected batteries B1 to Bn.

The voltage detection and drive signal generation unit 10 detects the voltages of respective series-connected batteries B1 to Bn, compares the detected voltages with a reference voltage, and generates a drive signal required to discharge energy from batteries, which are charged to voltages greater than the reference voltage, that is, overcharged batteries. The drive signal generated by the voltage detection and drive signal generation unit 10 is provided to switches connected in parallel with the overcharged batteries, thus forming a closed loop to allow the energy of the overcharged batteries to be supplied to the primary windings of the transformers T1 to Tn.

However, the conventional charge equalization apparatus is problematic in that, since the diodes D1 to Dn are connected in series with the secondary windings, voltages which are about twice the voltages of the series-connected batteries B1 to Bn are induced at the diodes D1 to Dn when the switches SW1 to SWn are turned on, thus increasing voltage stress on the diodes D1 to Dn. In other words, when the switches SW1 to SWn are turned on, both voltages supplied from overcharged batteries to the primary windings of the transformers and voltages supplied from the series-connected batteries B1 to Bn are induced at the diodes D1 to Dn, so that high voltage stress is applied to the diodes D1 to Dn. Accordingly, the withstand voltages of the diodes D1 to Dn connected in series with the secondary windings of the transformers T1 to Tn increase, and thus the cost of the charge equalization apparatus increases.

In addition, in the conventional charge equalization apparatus, since the number of turns in the secondary windings of the transformers T1 to Tn is N times (N is the number of series-connected batteries) the number of turns in the primary windings, there are many limitations in the implementation of secondary windings as the number of batteries increases.

DISCLOSURE

Technical Problem

Accordingly, the present invention has been made keeping in mind the above problems, and the present invention is intended to provide a charge equalization apparatus and method, which decrease the withstand voltages of semiconductor switching elements, thus making it easy to implement secondary windings of transformers while decreasing the cost of the charge equalization apparatus.

Technical Solution

In accordance with an aspect of the present invention, there is provided a charge equalization apparatus, comprising N first transformers connected in parallel to N series-connected batteries and adapted to decrease voltages of overcharged batteries among the N batteries; a charge storage device for storing energy supplied from the first transformers; a second transformer for redistributing energy stored in the charge storage device to the N series-connected batteries; and a voltage detection and drive signal generation unit for detecting voltages of N respective series-connected batteries, and for generating a first drive signal, required to discharge energy from overcharged batteries, and a second drive signal, required to supply the energy stored in the charge storage device to the second transformer.

In accordance with another aspect of the present invention, there is provided a charge equalization apparatus, comprising N transformers connected in parallel to N series-connected batteries, respectively, and adapted to decrease voltages of overcharged batteries among the N series-connected batteries; a charge storage device for storing energy supplied from the transformers; a voltage detection and drive signal generation unit for detecting voltages of N respective series-connected batteries and generating a drive signal required to discharge energy from overcharged batteries; N discharge switches connected between primary windings of the N transformers and anodes of the N batteries, and operated in response to the drive signal; and N semiconductor switching elements respectively connected between first ends of the secondary windings of the N transformers and an cathode of the charge storage device.

In accordance with a further aspect of the present invention, there is provided a charge equalization method, comprising the steps of (a) detecting voltages of N series-connected batteries; (b) comparing the detected voltages with a first reference voltage, discharging energy from overcharged batteries, which are charged to voltages greater than the first reference voltage, and storing the energy supplied from the overcharged batteries in a charge storage device; and (c) detecting voltage of the charge storage device, comparing the detected voltage with a second reference voltage, and redistributing the detected voltage to the N series-connected batteries when the detected voltage is equal to the second reference voltage, thus recharging energy drawn from the overcharged batteries in the N series-connected batteries.

In accordance with yet another aspect of the present invention, there is provided a charge equalization method, comprising the steps of (a) detecting voltages of N respective series-connected batteries; (b) comparing the detected voltages with a reference voltage, and discharging energy from overcharged batteries, which are charged to voltages greater than the reference voltage; and (c) storing the energy supplied from the overcharged batteries in a charge storage device.

Advantageous Effects

The present invention is advantageous in that transformers are implemented in two stages, thus reducing voltage stress on first switching elements connected in series with the secondary windings of first transformers.

Accordingly, the withstand voltages of first semiconductor switching elements are decreased, thus enabling a charge equalization apparatus to be manufactured at high efficiency and at low cost.

Further, transformers are implemented in two stages, so that the turns ratio of first transformers can be reduced, thus making it easy to manufacture secondary windings.

Figure 1:
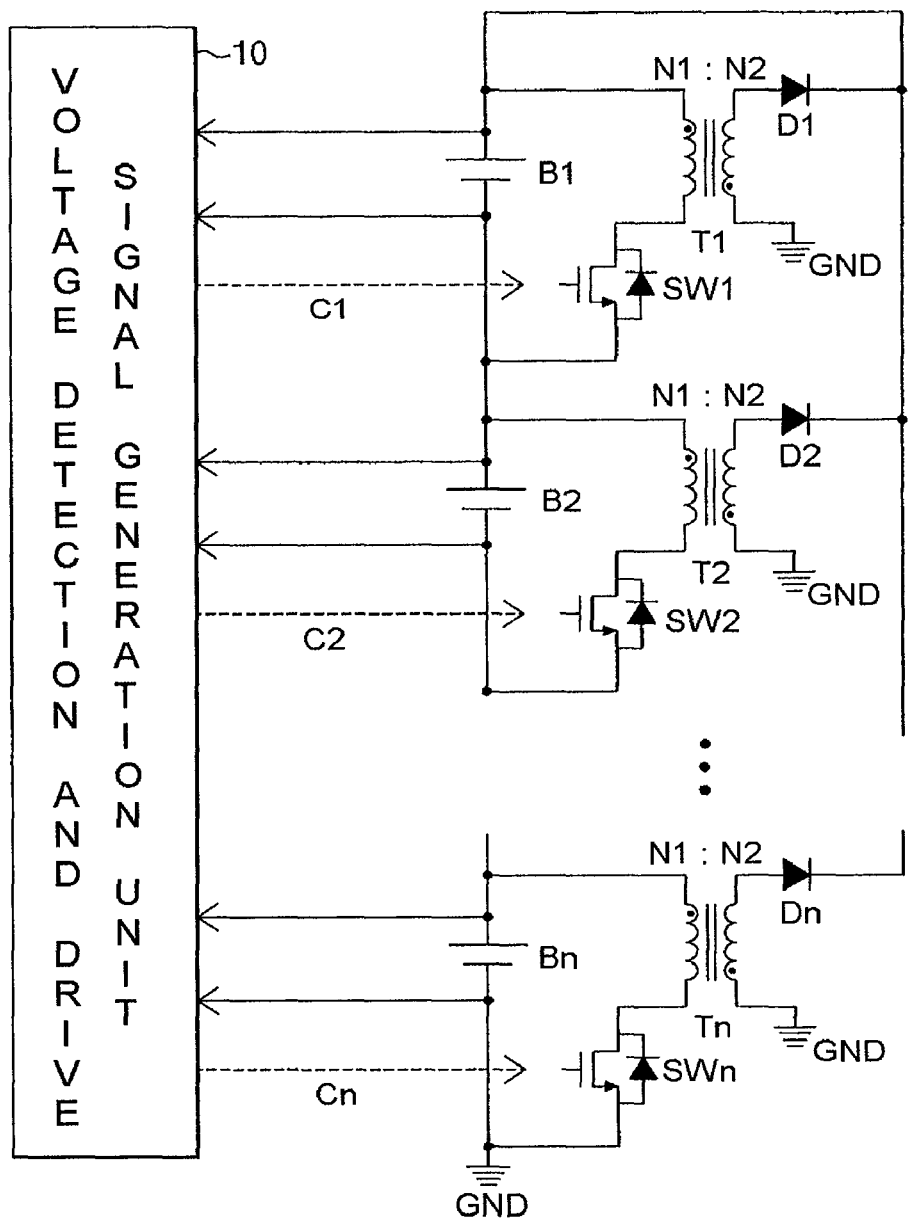
FIG. 1 is a diagram showing a conventional charge equalization apparatus.

DESCRIPTION OF REFERENCE CHARACTERS OF IMPORTANT PARTS 10, 20, 30, 40: voltage detection and drive signal generation unit
20: sensing unit
24: microprocessor
26: switch driving circuit unit

BEST MODE

Hereinafter, embodiments of the present invention will be described in detail with reference to the attached drawings.

Figure 2:
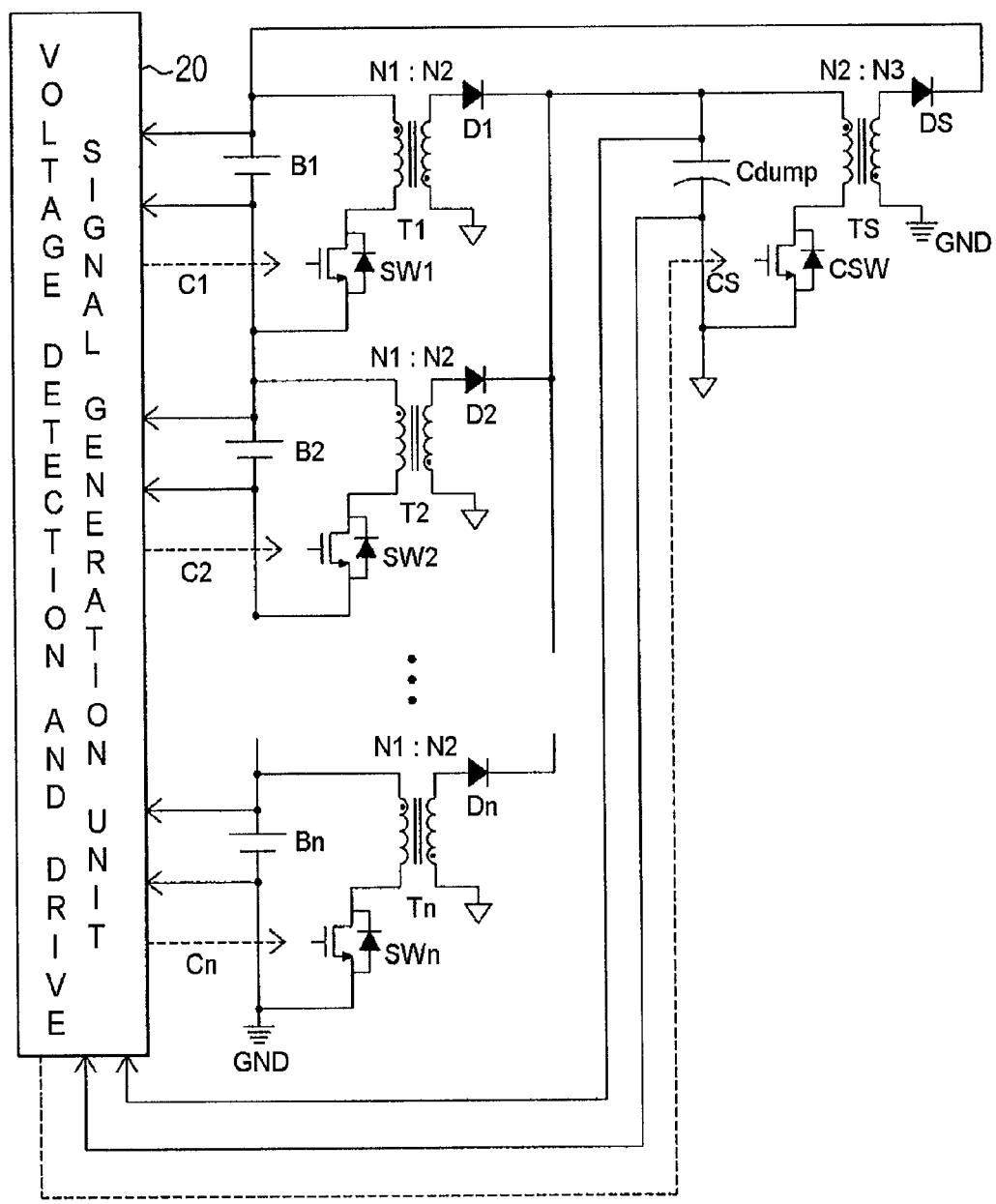
FIG. 2 is a diagram showing a charge equalization apparatus according to an embodiment of the present invention.
Figure 3:
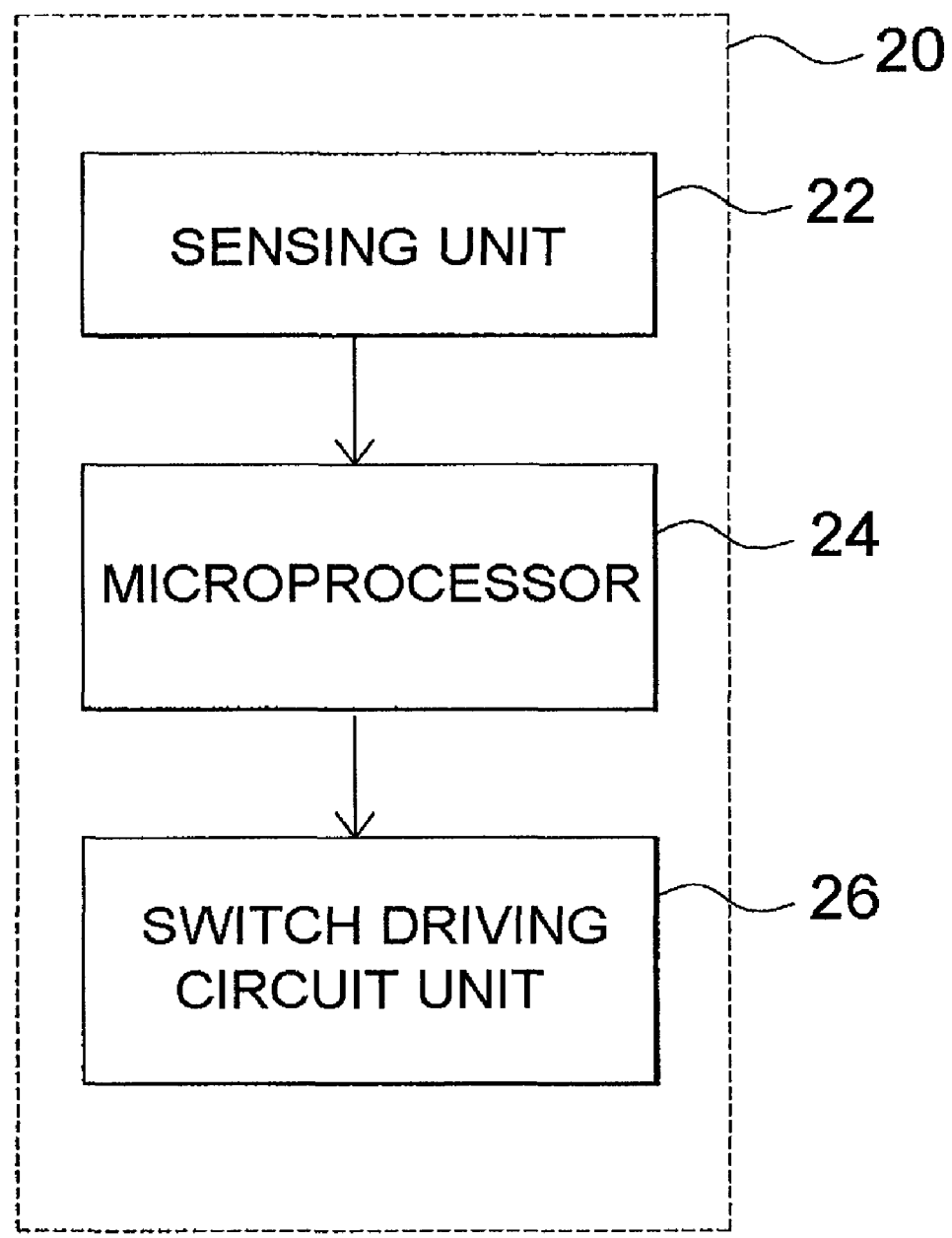
FIG. 3 is a diagram showing the voltage detection and drive signal generation unit of FIG. 2.

FIG. 2 is a diagram showing a charge equalization apparatus according to an embodiment of the present invention, and FIG. 3 is a diagram showing the voltage detection and drive signal generation unit of FIG. 2.

Referring to FIGS. 2 and 3, the charge equalization apparatus according to an embodiment of the present invention includes N first transformers T1 to Tn for decreasing the voltages of overcharged batteries among series-connected batteries B1 to Bn, a charge storage device Cdump for storing energy supplied from the N first transformers T1 to Tn, a second transformer TS for redistributing energy supplied from the N first transformers T1 to Tn to N batteries B1 to Bn, N discharge switches SW1 to SWn connected in series with the primary windings of the N first transformers T1 to Tn, respectively, N first semiconductor switching elements D1 to Dn connected in series with the secondary windings of the N first transformers T1 to Tn, respectively, a redistribution switch CSW connected in series with the primary winding of the second transformer TS, a second semiconductor switching element DS connected in series with the secondary winding of the second transformer TS, and a voltage detection and drive signal generation unit 20 for detecting the voltages of N respective batteries B1 to Bn and controlling the driving of the N discharge switches SW1 to SWn and the redistribution switch CSW.

The N first transformers T1 to Tn are implemented such that the primary windings thereof are connected between both ends of the N batteries B1 to Bn, respectively, so as to decrease the voltages of overcharged batteries among the N batteries B1 to Bn. That is, the first ends of the primary windings of the N first transformers T1 to Tn are connected to the cathodes of the batteries, the second end of the primary windings are connected to the first ends of the discharge switches, and the second end of the discharge switches are connected to the anodes of the batteries.

Further, the first ends of the secondary windings of the N first transformers T1 to Tn are connected to the first semiconductor switching elements D1 to Dn, respectively, and the second end of the secondary windings are connected both to the anode of the charge storage device Cdump and to the second end of the redistribution switch CSW.

Each of the N first transformers T1 to Tn is implemented in a flyback structure, in which the polarities of the primary winding and the secondary winding are opposite each other, that is, in which a dot formed on the primary winding and a dot formed on the secondary winding are located at different sides, but may be alternatively implemented in a forward structure, in which the polarities of the primary winding and the secondary winding are the same as each other. In this case, the N first transformers T1 to Tn have the same turns ratio of the primary winding to the secondary winding, that is, N1:N2, where N2 is greater than N1.

The first end of the charge storage device Cdump is connected both to the first end of the primary winding of the second transformer TS and to the second end of the first semiconductor switching elements D1 to Dn, and the second end thereof is connected both to the second end of the redistribution switch CSW and to the second end of the secondary windings of the N first transformers T1 to Tn. Accordingly, the charge storage device Cdump stores energy supplied from the first transformers, which have drawn energy from the overcharged batteries, among the N first transformers T1 to Tn. Such a charge storage device Cdump is implemented using a capacitor, but may be implemented using either a capacitor or a battery, and has a capacity determined to be proportional to the number of overcharged batteries.

The second transformer TS functions to redistribute the energy supplied from the overcharged batteries and stored in the charge storage device Cdump, that is, the energy supplied from the N first transformers T1 to Tn, to the N series-connected batteries B1 to Bn, thus recharging the N series-connected batteries B1 to Bn.

For this operation, the primary winding of the second transformer TS is connected between both ends of the charge storage device Cdump, and the secondary winding thereof is connected each of the cathode of the first battery B1 and a ground GND. In detail, the first end of the primary winding of the second transformer TS is connected to the cathode of the charge storage device Cdump, the second end of the primary winding is connected to the second end of the redistribution switch CSW, the first end of the secondary winding is connected to the second semiconductor switching element DS, and the second end of the secondary winding is connected to the ground GND.

Such a second transformer TS is implemented in a flyback structure, but may be implemented in either a flyback structure or a forward structure. In this case, when the number of overcharged batteries increases, the energy discharged from the overcharged batteries increases, and thus the second transformer TS has a capacity larger than that of the N first transformers T1 to Tn. Further, the second transformer TS has a turns ratio of the primary winding to the secondary winding, that is, N2:N3, N3 being greater than N2.

The N discharge switches SW1 to SWn are connected between the second end of the primary windings of the N first transformers T1 to Tn and the anodes of the N batteries B1 to Bn, respectively, and are operated in response to a first drive signal provided by the voltage detection and drive signal generation unit 20.

The N discharge switches SW1 to SWn are turned on when a first drive signal in a high state is provided by the voltage detection and drive signal generation unit 20, thus forming a closed loop to induce energy (charge) discharged from overcharged batteries, among the N batteries B1 to Bn, in the primary windings of the first transformers. The N discharge switches SW1 to SWn are turned off when a first drive signal in a low state is provided by the voltage detection and drive signal generation unit 20, thus forming an open loop to transfer energy, which is supplied to the primary windings of the first transformers, to the secondary windings of the first transformers.

Each of the N discharge switches SW1 to SWn is formed of an N-type Metal Oxide Semiconductor Field Effect Transistor (MOSFET), but may alternatively be formed of any one of switching elements such as a MOSFET, a Bipolar Junction Transistor (BJT), and a relay.

The N first semiconductor switching elements D1 to Dn are connected to the first ends of the secondary windings of the N first transformers T1 to Tn, the cathode of the charge storage device Cdump, and the first end of the primary winding of the second transformer TS, so that they function to turn off the second windings of the first transformers when the primary windings of the first transformers are turned on, and to turn on the secondary windings when the primary windings are turned off.

In other words, the N first semiconductor switching elements D1 to Dn are respectively operated such that, when energy discharged from the overcharged batteries is stored in the primary windings of the first transformers, the energy supplied from the secondary windings is supplied to the charge storage device Cdump.

Each of the N first semiconductor switching elements D1 to Dn is formed of a diode, but may alternatively be formed of any one of a MOSFET, a BJT, a relay, and a diode.

The redistribution switch CSW is connected between the second end of the primary winding of the second transformer and the anode of the charge storage device Cdump, and is operated in response to a second drive signal provided by the voltage detection and drive signal generation unit 20.

Such a redistribution switch CSW is turned on when a second drive signal in a high state is provided by the voltage detection and drive signal generation unit 20, thus forming a closed loop to induce the energy charged in the charge storage device Cdump in the primary winding of the second transformer TS. The redistribution switch CSW is turned off when a second drive signal in a low state is provided by the voltage detection and drive signal generation unit 20, thus forming an open loop to transfer the energy, which has been supplied to the primary winding of the second transformer, to the secondary winding of the second transformer.

The redistribution switch CSW is formed of an N-type MOSFET, but may alternatively be formed of any one of switches such as a MOSFET, a BJT, and a relay.

The second semiconductor switching element DS is connected between the first end of the secondary winding of the second transformer TS and the cathode of the first battery B1 of the N series-connected batteries B1 to Bn, and is operated such that, when energy is stored in the primary winding of the second transformer TS, energy supplied from the secondary winding is redistributed to the N series-connected batteries B1 to Bn.

The second semiconductor switching element DS is formed of a diode, but may be formed of any one of a MOSFET, a BJT, a relay, and a diode.

The voltage detection and drive signal generation unit 20 detects the voltages of N respective series-connected batteries B1 to Bn, compares the detected voltages with a first reference voltage, and generates a first drive signal required to discharge energy from batteries, which are charged to voltages greater than the first reference voltage, that is, overcharged batteries, and outputs the first drive signal to the discharge switches when the detected voltages are greater than the first reference voltage.

Accordingly, when some of the N series-connected batteries B1 to Bn are overcharged, the discharge switches form a closed loop to supply the energy of the overcharged batteries to the primary windings of the first transformers.

Further, the voltage detection and drive signal generation unit 20 detects the voltage of the charge storage device Cdump, and generates a second drive signal required to supply the energy, stored in the charge storage device Cdump, to the primary winding of the second transformer TS and provides the second drive signal to the redistribution switch CSW when the voltage of the charge storage device Cdump is equal to a second reference voltage.

At this time, the voltage detection and drive signal generation unit 20 prevents energy from being continuously charged in the charge storage device Cdump, and generates the second drive signal to turn on the redistribution switch CSW at the moment at which the voltage of the charge storage device Cdump becomes the second reference voltage, and provides the second drive signal to the redistribution switch CSW so that, before the charge storage device Cdump consumes power through self-discharge, the voltage of the charge storage device Cdump is supplied to the primary winding of the second transformer TS.

Further, when at least one of the N series-connected batteries B1 to Bn is overdischarged to a voltage much lower than the first reference voltage, the voltage detection and drive signal generation unit 20 generates a second drive signal to supply the charge stored in the charge storage device Cdump to the overdischarged battery, and provides the second drive signal to the redistribution switch CSW.

The voltage detection and drive signal generation unit 20 includes a sensing unit 22, a microprocessor 24, and a switch driving circuit unit 26.

The sensing unit 22 is connected to respective batteries B1 to Bn and is adapted to detect the voltages of respective batteries B1 to Bn.

The microprocessor 24 sets a mean voltage of the voltages of the batteries B1 to Bn, detected by the sensing unit 22, to a reference voltage, and sets the ON/OFF time of the discharge switches SW1 to SWn and the redistribution switch CSW for charging/discharging batteries when the difference between the reference voltage and the voltages detected by the sensing unit 22 is equal to or greater than a predetermined value.

The switch driving circuit unit 26 generates a first drive signal and a second drive signal in response to a signal input from the microprocessor 24, and provides the first drive signal and the second drive signal to the discharge switches SW1 to SWn and the redistribution switch CSW, respectively.

In the charge equalization apparatus according to the embodiment of the present invention, transformers are implemented in two stages, thus decreasing voltage stress on the first semiconductor switching elements D1 to Dn, connected in series with the secondary windings of the first transformers T1 to Tn.

In other words, since voltage stress proportional to the voltage of the charge storage device Cdump is applied to the first semiconductor switching elements D1 to Dn, the voltage stress on the first semiconductor switching elements D1 to Dn can be decreased in proportion to the voltage supplied from the N series-connected batteries B1 to Bn.

Accordingly, the withstand voltages of the first semiconductor switching elements D1 to Dn are decreased, and thus a high efficiency and low cost charge equalization apparatus can be manufactured.

Further, the transformers are implemented in two stages, so that the turns ratio of the first transformers T1 to Tn is reduced, thus making it easy to manufacture the secondary windings of the first transformers.

A method of equalizing the voltages of batteries using the charge equalization apparatus according to an embodiment of the present invention is described below.

First, the voltage detection and drive signal generation unit 20 detects the voltages of N respective series-connected batteries B1 to Bn.

When voltages greater than a first reference voltage are detected in some of the N series-connected batteries B1 to Bn, the voltage detection and drive signal generation unit 20 generates a first drive signal, required to drive discharge switches connected in parallel with overcharged batteries, in order to discharge energy from the overcharged batteries, and provides the first drive signal to the discharge switches.

For example, when the first battery B1 of the N batteries B1 to Bn is assumed to be overcharged, the voltage detection and drive signal generation unit 20 provides a first drive signal in a high state to the first discharge switch SW1.

Accordingly, the first discharge switch SW1 is turned on, and thus a closed loop sequentially extending to the first battery B1, the primary winding of the first transformer T1, and the first discharge switch SW1, is formed. As a result, the charge stored in the first battery B1 is discharged and is stored in the primary winding of the first transformer T1, with the charge converted into magnetic energy.

Thereafter, the voltage detection and drive signal generation unit 20 provides a first drive signal in a low state to the first discharge switch SW1, thus turning off the first discharge switch SW1.

Accordingly, a counter electromotive force is generated, so that the energy stored in the primary winding is transferred to the secondary winding and is converted into charge, which is supplied to the charge storage device Cdump through the first semiconductor switching element D1. In this case, the charge storage device Cdump stores the charge supplied through the first semiconductor switching element D1.

When the charge storage device Cdump stores the charge, the voltage detection and drive signal generation unit 20 detects the voltage of the charge storage device Cdump, and generates a second drive signal in a high state required to drive the redistribution switch CSW and provides the second drive signal to the redistribution switch CSW when the detected voltage becomes a second reference voltage.

Accordingly, the redistribution switch CSW is turned on, and thus a closed loop sequentially extending to the charge storage device Cdump, the primary winding of the second transformer TS, and the redistribution switch CSW is formed. As a result, the charge stored in the charge storage device Cdump is stored in the primary winding of the second transformer TS, with the charge converted into magnetic energy.

Thereafter, the voltage detection and drive signal generation unit 20 provides a second drive signal in a low state to the redistribution switch CSW, thus turning off the redistribution switch CSW. As a result, a counter electromotive force is generated, so that the magnetic energy, stored in the primary winding of the second transformer TS, is transferred to the secondary winding of the second transformer and is converted into charge, and the charge is redistributed to the N series-connected batteries B1 to Bn through the second semiconductor switching element DS, thus recharging the N series-connected batteries B1 to Bn.

This driving operation is continuously repeated until the voltages of the N series-connected batteries are equalized.

Figure 4:
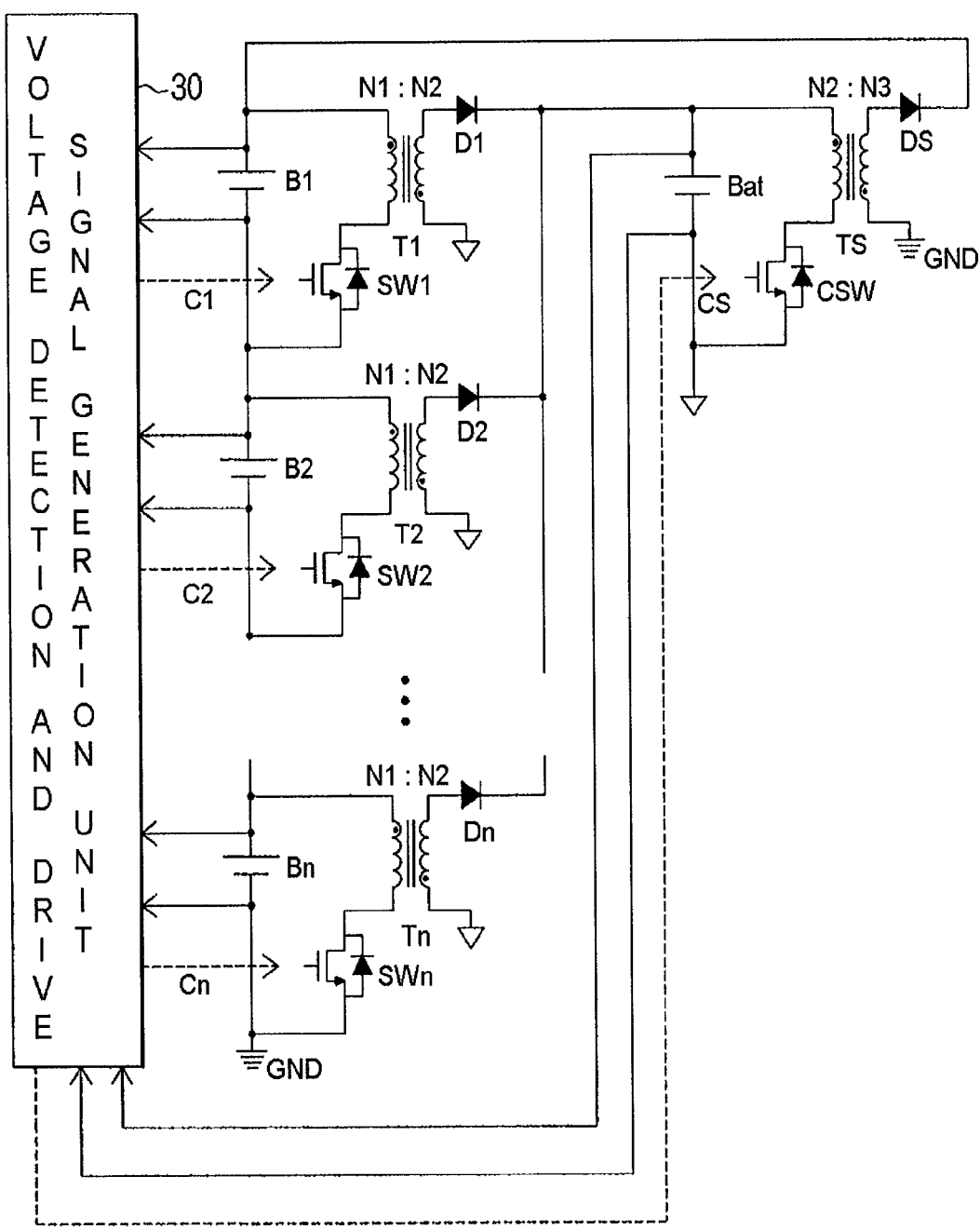
FIG. 4 is a diagram showing a charge equalization apparatus according to another embodiment of the present invention.

FIG. 4 is a diagram showing a charge equalization apparatus according to another embodiment of the present invention.

Referring to FIG. 4, a charge equalization apparatus according to another embodiment of the present invention includes N first transformers T1 to Tn for decreasing the voltages of overcharged batteries among series-connected batteries B1 to Bn, a charge storage device Bat for storing energy supplied from the N first transformers T1 to Tn, a second transformer TS for redistributing the energy supplied from the N first transformers T1 to Tn to N batteries B1 to Bn, N discharge switches SW1 to SWn connected in series with the primary windings of the N first transformers T1 to Tn, respectively, N first semiconductor switching elements D1 to Dn connected in series with the secondary windings of the N first transformers T1 to Tn, respectively, a redistribution switch CSW connected in series with the primary winding of the second transformer TS, a second semiconductor switching element DS connected in series with the secondary winding of the second transformer TS, and a voltage detection and drive signal generation unit 30 for detecting the voltages of N respective batteries B1 to Bn and controlling the driving of the N discharge switches SW1 to SWn and the redistribution switch CSW.

The primary windings of the N first transformers T1 to Tn are connected between both ends of the N batteries B1 to Bn, respectively, so as to decrease the voltages of overcharged batteries among the N batteries B1 to Bn. In detail, the first ends of the primary windings of the N first transformers T1 to Tn are connected to the cathodes of the batteries, the second end of the primary windings are connected to the first ends of the discharge switches, and the second end of the discharge switches are connected to the anodes of the batteries.

Further, the first ends of the secondary windings of the N first transformers T1 to Tn are connected to the first semiconductor switching elements D1 to Dn, respectively, and the second end of the secondary windings are connected both to the anode of the charge storage device Bat and to the first end of the redistribution switch CSW.

Each of the N first transformers T1 to Tn is implemented in a flyback structure, in which the polarities of the primary winding and the secondary winding are opposite each other, that is, in which a dot formed on the primary winding and a dot formed on the secondary winding are located at different sides, but may be alternatively implemented in a forward structure, in which the polarities of the primary winding and the secondary winding are the same as each other. In this case, the N first transformers T1 to Tn have the same turns ratio of the primary winding to the secondary winding, that is, N1:N2, where N2 is greater than N1.

The first end of the charge storage device Bat is connected both to the first end of the primary winding of the second transformer TS and to the second ends of the first semiconductor switching elements D1 to Dn, and the second end thereof is connected both to the first end of the redistribution switch CSW and to the second ends of the secondary windings of the N first transformers T1 to Tn. Accordingly, the charge storage device Bat stores energy supplied from the first transformers, which have drawn energy from the overcharged batteries, among the N first transformers T1 to Tn. Such a charge storage device Bat is implemented using a battery for vehicles, but may be implemented using either a capacitor or a battery for vehicles, and the capacity thereof is determined to be proportional to the number of overcharged batteries.

The second transformer TS functions to redistribute the energy, which is supplied from overcharged batteries and is stored in the charge storage device Bat, that is, the energy supplied from the N first transformers T1 to Tn, to the N series-connected batteries B1 to Bn, thus recharging the N series-connected batteries B1 to Bn.

For this operation, the primary winding of the second transformer TS is connected between both ends of the charge storage device Bat, and the secondary winding of the second transformer TS is connected each of the cathodes of the first battery B1 and the ground GND. In detail, the first end of the primary winding of the second transformer TS is connected to the cathode of the charge storage device Bat, and the second end of the primary winding is connected to the second end of the redistribution switch CSW. The first end of the secondary winding is connected to the first end of the second semiconductor switching element DS, and the second end of the secondary winding is connected to the ground GND.

The second transformer TS is implemented in a flyback structure, but may be implemented in either a flyback structure or a forward structure. Further, when the number of overcharged batteries increase, energy discharged from overcharged batteries increase, and thus the second transformer TS must have a capacity larger than that of the N first transformers T1 to Tn. The second transformer TS has a turns ratio of the primary winding to the secondary winding, that is, N2:N3, N3 being greater than N2.

The N discharge switches SW1 to SWn are connected between the second end of the primary windings of the N first transformers T1 to Tn and the anodes of the N batteries B1 to Bn, respectively, and are operated in response to a first drive signal provided by the voltage detection and drive signal generation unit 30.

The discharge switches SW1 to SWn are turned on when a first drive signal in a high state is provided by the voltage detection and drive signal generation unit 30, thus forming a closed loop to induce energy (charge) discharged from overcharged batteries, among the N batteries B1 to Bn, in the primary windings of the first transformers. The discharge switches are turned off when a first drive signal in a low state is provided by the voltage detection and drive signal generation unit 30, thus forming an open loop to transfer the energy, supplied to the primary windings of the first transformers, to the secondary windings of the first transformers.

Each of the N discharge switches SW1 to SWn is formed of an N-type MOSFET, but may be formed of any one of switching elements such as a MOSFET, a BJT, and a relay.

The N first semiconductor switching elements D1 to Dn are connected between the first ends of the secondary windings of the N first transformers T1 to Tn and the cathodes of the charge storage device Bat, so that they function to turn off the secondary windings of the first transformers when the primary windings of the first transformers are turned on, and to turn on the secondary windings when the primary windings are turned off.

In other words, the N first semiconductor switching elements D1 to Dn are respectively operated such that, when energy discharged from the overcharged batteries is stored in the primary windings of the first transformers, the energy supplied from the secondary windings is supplied to the charge storage device Bat.

Each of the N first semiconductor switching elements D1 to Dn is formed of a diode, but may be formed of any one of switching elements such as a MOSFET, a BJT, a relay, and a diode.

The redistribution switch CSW is connected between the second end of the primary winding of the second transformer and the anode of the charge storage device Bat, and is operated in response to a second drive signal provided by the voltage detection and drive signal generation unit 30.

The redistribution switch CSW is turned on when a second drive signal in a high state is provided by the voltage detection and drive signal generation unit 30, thus forming a closed loop to induce the energy, charged in the charge storage device Bat, in the primary winding of the second transformer TS. The redistribution switch CSW is turned off when a second drive signal in a low state is provided by the voltage detection and drive signal generation unit 30, thus forming an open loop to transfer the energy, which has been supplied to the primary winding of the second transformer, to the secondary winding of the second transformer.

The redistribution switch CSW is formed of an N-type MOSFET, but may be formed of any one of switching elements such as a MOSFET, a BJT, and a relay.

The second semiconductor switching element DS is connected between the first end of the secondary winding of the second transformer TS and the cathode of the first battery B1 of the N series-connected batteries B1 to Bn, and is operated such that, when energy is stored in the primary winding of the second transformer TS, energy supplied from the secondary winding is redistributed to the N series-connected batteries B1 to Bn.

The second semiconductor switching element DS is formed of a diode, but may be formed of any one of switching elements, such as a MOSFET, a BJT, a relay, and a diode.

The voltage detection and drive signal generation unit 30 detects the voltages of N respective series-connected batteries B1 to Bn, compares the detected voltages with a first reference voltage, and generates a first drive signal required to discharge energy from batteries, which are charged to voltages greater than the first reference voltage, that is, overcharged batteries, and outputs the first drive signal to the discharge switches when the detected voltages are greater than the first reference voltage.

Accordingly, when some of the N series-connected batteries B1 to Bn are overcharged, the discharge switches form a closed loop to supply the energy of the overcharged batteries to the primary windings of the first transformers.

Further, the voltage detection and drive signal generation unit 30 detects the voltage of the charge storage device Bat, and generates a second drive signal required to supply the energy stored in the charge storage device Bat to the primary winding of the second transformer TS, and provides the second drive signal to the redistribution switch CSW when the voltage of the charge storage device Bat increases up to a second reference voltage or has the possibility of increasing up to the second reference voltage.

In this case, in order to maintain the voltage of the charge storage device Bat at a uniform voltage, the voltage detection and drive signal generation unit 30 generates a second drive signal, required to turn on the redistribution switch CSW so that the voltage of the charge storage device Bat is supplied to the primary winding of the second transformer TS, and provides the second drive signal to the redistribution switch CSW when the voltage of the charge storage device Bat increases up to the second reference voltage, or has the possibility of increasing up to the second reference voltage.

Further, when at least one of the N series-connected batteries B1 to Bn is overdischarged to a voltage much lower than the first reference voltage, the voltage detection and drive signal generation unit 30 generates a second drive signal to supply charge, stored in the charge storage device Bat, to the overdischarged battery, and provides the second drive signal to the redistribution switch CSW.

As shown in FIG. 3, the voltage detection and drive signal generation unit 30 includes a sensing unit 22, a microprocessor 24, and a switch driving circuit unit 26.

The sensing unit 22 is connected to respective batteries B1 to Bn, and is adapted to detect the voltages of respective batteries B1 to Bn.

The microprocessor 24 sets a mean voltage of the voltages of the batteries B1 to Bn, detected by the sensing unit 22, to a reference voltage, and thus sets the ON/OFF time of the discharge switches SW1 to SWn and the redistribution switch CSW for charging/discharging the batteries when the difference between the reference voltage and the voltages detected by the sensing unit 22 is equal to or greater than a predetermined value.

The switch driving circuit unit 26 generates a first drive signal and a second drive signal in response to a signal input from the microprocessor 24, and provides the first drive signal and the second drive signal to the discharge switches SW1 to SWn and the redistribution switch CSW, respectively.

In the charge equalization apparatus according to the embodiment of the present invention, transformers are implemented in two stages, thus decreasing voltage stress on the first semiconductor switching elements D1 to Dn connected in series with the secondary windings of the first transformers T1 to Tn.

In other words, since voltage stress equal to the capacity of the charge storage device Bat is applied to the first semiconductor switching elements D1 to Dn, the voltage stress on the first semiconductor switching elements D1 to Dn can be decreased in proportion to the voltage supplied from the N series-connected batteries B1 to Bn.

Accordingly, the withstand voltages of the first semiconductor switching elements D1 to Dn are decreased, and thus a high efficiency and low cost charge equalization apparatus can be manufactured.

Further, the transformers are implemented in two stages, so that the turns ratio of the first transformers T1 to Tn is reduced, thus making it easy to manufacture the secondary windings of the first transformers.

A method of equalizing the voltages of batteries using the charge equalization apparatus according to another embodiment of the present invention is described below.

First, the voltage detection and drive signal generation unit 30 detects the voltages of N respective series-connected batteries B1 to Bn.

When voltages greater than a first reference voltage are detected in some of the N series-connected batteries B1 to Bn, the voltage detection and drive signal generation unit 30 generates a first drive signal required to drive discharge switches, connected in parallel with overcharged batteries, in order to discharge energy from the overcharged batteries, and provides the first drive signal to the discharge switches.

For example, when the first battery B1 of the N batteries B1 to Bn is assumed to be overcharged, the voltage detection and drive signal generation unit 30 provides a first drive signal in a high state to the first discharge switch SW1.

As a result, the first discharge switch SW1 is turned on, and thus a closed loop, sequentially extending to the first battery B1, the primary winding of the first transformer T1, and the first discharge switch SW1, is formed. Accordingly, the charge stored in the first battery B1 is discharged and is stored in the primary winding of the first transformer T1, with the charge converted into magnetic energy.

Thereafter, the voltage detection and drive signal generation unit 30 provides a first drive signal in a low state to the first discharge switch SW1, thus turning off the first discharge switch SW1.

Accordingly, a counter electromotive force is generated, so that the energy stored in the primary winding of the first transformer is transferred to the secondary winding thereof and is converted into charge, which is provided to the charge storage device Bat through the first semiconductor switching element D1. In this case, the charge storage device Bat stores the charge supplied through the first semiconductor switching element D1.

When the voltage of the charge storage device Bat increases up to a second reference voltage or has the possibility of increasing up to the second reference voltage, the voltage detection and drive signal generation unit 30 generates a second drive signal in a high state required to drive the redistribution switch CSW, and provides the second drive signal to the redistribution switch CSW.

Accordingly, the redistribution switch CSW is turned on, and thus a closed loop sequentially extending to the charge storage device Bat, the primary winding of the second transformer TS, and the redistribution switch CSW is formed. As a result, the charge stored in the charge storage device Bat is stored in the primary winding of the second transformer TS, with the charge converted into magnetic energy.

Thereafter, the voltage detection and drive signal generation unit 30 provides a second drive signal in a low state to the redistribution switch CSW, thus turning off the redistribution switch CSW. Accordingly, a counter electromotive force is generated, so that the magnetic energy stored in the primary winding of the second transformer TS is transferred to the secondary winding of the second transformer and is converted into charge, and the charge is redistributed to the N series-connected batteries B1 to Bn through the second semiconductor switching element DS, thus recharging the N series-connected batteries B1 to Bn.

This driving operation is continuously repeated until the voltages of the N series-connected batteries are equalized.

Figure 5:
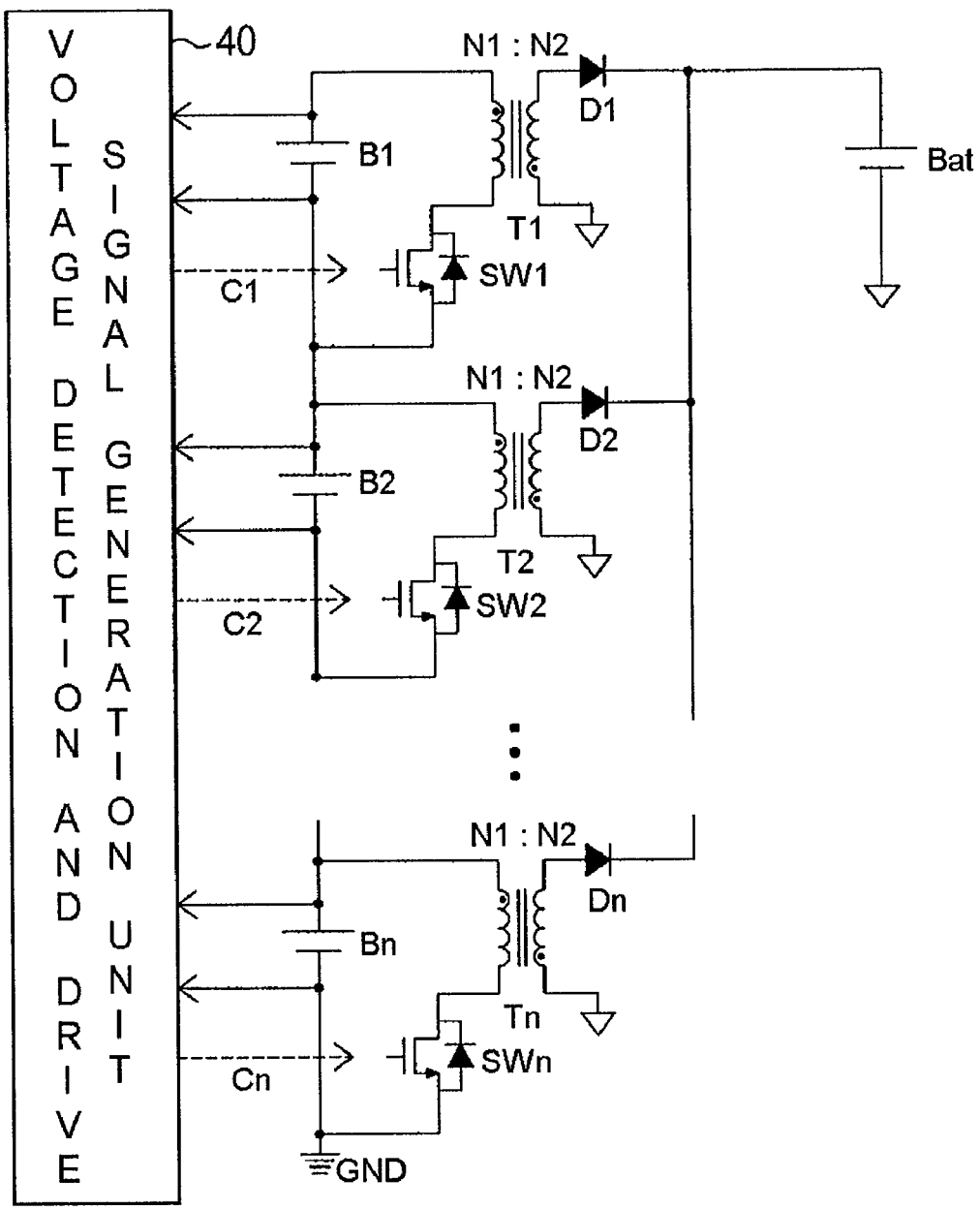
FIG. 5 is a diagram showing a charge equalization apparatus according to a further embodiment of the present invention.

FIG. 5 is a diagram showing a charge equalization apparatus according to a further embodiment of the present invention.

Referring to FIG. 5, the charge equalization apparatus according to a further embodiment of the present invention includes N transformers T1 to Tn for decreasing the voltages of overcharged batteries among series-connected batteries B1 to Bn, a charge storage device Bat for storing energy supplied from the N transformers T1 to Tn, N discharge switches SW1 to SWn connected in series with the primary windings of the N transformers T1 to Tn, respectively, N semiconductor switching elements D1 to Dn, connected in series with the secondary windings of the N transformers T1 to Tn, respectively, and a voltage detection and drive signal generation unit 40 for detecting the voltages of N respective batteries B1 to Bn and controlling the driving of the N discharge switches SW1 to SWn.

The primary windings of the N transformers T1 to Tn are connected between both ends of the N batteries B1 to Bn, respectively, so as to decrease the voltages of overcharged batteries among the N batteries B1 to Bn. That is, the first ends of the primary windings of the N transformers T1 to Tn are connected to the cathodes of the batteries, the second end of the primary windings are connected to the first ends of the discharge switches, and the second end of the discharge switches are connected to the anodes of the batteries.

Further, the first ends of the secondary windings of the N transformers T1 to Tn are connected to the first end of the semiconductor switching elements D1 to Dn, respectively, and the second ends of the secondary windings are connected in common to the anode of the charge storage device Bat.

Each of the N transformers T1 to Tn is implemented in a flyback structure, but may be implemented in either a flyback structure or a forward structure. In this case, the N transformers T1 to Tn have the same turns ratio of the primary winding to the secondary winding, that is, N1:N2, N2 being greater than N1.

The charge storage device Bat stores energy supplied from the transformers that have drawn energy from overcharged batteries, among the N transformers T1 to Tn. The cathode of the charge storage device Bat is connected to the common node of the second ends of the semiconductor switching elements D1 to Dn, and the anode thereof is connected to the second end of the secondary windings of the transformers T1 to Tn.

Here, the charge storage device Bat is implemented using a battery for vehicles, but may be implemented using either a capacitor or a battery for vehicles, and has a capacity sufficiently large to hold the charge discharged from overcharged batteries.

The N discharge switches SW1 to SWn are respectively connected between the second end of the primary windings of the N transformers T1 to Tn and the anodes of the N batteries B1 to Bn, and are operated in response to a drive signal provided by the voltage detection and drive signal generation unit 40.

The discharge switches are turned on when a drive signal in a high state is provided by the voltage detection and drive signal generation unit 40, thus forming a closed loop to induce energy (charge), discharged from overcharged batteries among the N batteries B1 to Bn, in the primary windings of the transformers, and are turned off when a drive signal in a low state is provided by the voltage detection and drive signal generation unit 40, thus forming an open loop to transfer the energy, supplied to the primary windings of the transformers, to the secondary windings of the transformers.

In this case, each of the N discharge switches SW1 to SWn is formed of an N-type MOSFET, but may alternatively be formed of any one of switching elements such as a MOSFET, a BJT, and a relay.

The N semiconductor switching elements D1 to Dn are connected between the first ends of the secondary windings of the N transformers T1 to Tn and the cathode of the charge storage device Bat, and are adapted to turn off the secondary windings of the transformers when the primary windings of the transformers are turned on, and to turn on the secondary windings when the primary windings are turned off.

In other words, the N semiconductor switching elements D1 to Dn are respectively operated such that, when energy discharged from overcharged batteries is stored in the primary windings of the transformers, the energy supplied from the secondary windings is transferred to the charge storage device Bat.

Each of the N semiconductor switching elements D1 to Dn is formed of a diode, but may be formed of any one of switching elements such as a MOSFET, a BJT, a relay, and a diode.

The voltage detection and drive signal generation unit 40 detects the voltages of N respective series-connected batteries B1 to Bn, compares the detected voltages with a reference voltage, and generates a first drive signal required to discharge energy from batteries which are charged to voltages greater than the reference voltage, that is, overcharged batteries, and provides the drive signal to the discharge switches when the detected voltages are greater than the reference voltage. At this time, either the mean voltage of the voltages of the series-connected batteries B1 to Bn or the lowest voltage thereof can be used as the reference voltage.

Accordingly, when some of the N series-connected batteries B1 to Bn are overcharged, the discharge switches form a closed loop so that energy of the overcharged batteries is supplied to the primary windings of the transformers.

As shown in FIG. 3, the voltage detection and drive signal generation unit 40 includes a sensing unit 22, a microprocessor 24, and a switch driving circuit unit 26.

The sensing unit 22 is connected to respective batteries B1 to Bn and is adapted to detect the voltages of respective batteries B1 to Bn.

The microprocessor 24 sets a mean voltage of the voltages of the batteries B1 to Bn, detected by the sensing unit 22, to a reference voltage, and thus sets the ON/OFF time of the discharge switches SW1 to SWn for charging/discharging the batteries when the difference between the reference voltage and the voltages detected by the sensing unit 22 is equal to or greater than a predetermined value.

The switch driving circuit unit 26 generates a drive signal in response to a signal input from the microprocessor 24, and provides the drive signal to the discharge switches SW1 to SWn.

As described above, the charge equalization apparatus according to the further embodiment of the present invention discharges energy from batteries which are charged to voltages greater than the reference voltage, that is, overcharged batteries, through the charge storage device Bat, thus equalizing the voltages of the N series-connected batteries B1 to Bn.

Further, the second end of the secondary windings of the transformers T1 to Tn are connected in common to the anode of the charge storage device Bat, so that voltage stress on the semiconductor switching elements D1 to Dn can be reduced.

Accordingly, the withstand voltages of the semiconductor switching elements D1 to Dn can be decreased, thus enabling a high efficiency and low cost charge equalization apparatus to be manufactured.

Further, the charge equalization apparatus is constructed such that the charge storage device Bat is connected to the second end of the secondary windings of the transformers T1 to Tn, and thus the number of turns in the secondary windings can be decreased compared to the conventional charge equalization apparatus. Accordingly, the secondary windings can be easily manufactured.

A method of equalizing the voltages of batteries using the charge equalization apparatus according to a further embodiment of the present invention is described below.

First, the voltage detection and drive signal generation unit 40 detects the voltages of N respective series-connected batteries B1 to Bn.

When voltages greater than the reference voltage are detected in the N series-connected batteries B1 to Bn, the voltage detection and drive signal generation unit 40 generates a drive signal required to drive discharge switches, connected in parallel with overcharged batteries, in order to discharge energy from the overcharged batteries, and provides the drive signal to the discharge switches.

For example, when the voltage of the first battery B1 of the N batteries B1 to Bn is assumed to be lowest, the voltage detection and drive signal generation unit 40 provides a drive signal in a high state to the switches SW2 to SWn, other than the first discharge switch SW1, thus tuning on the switches SW2 to SWn, other than the first discharge switch SW1.

As a result, charge stored in the batteries B2 to Bn, other than the first battery B1, is discharged and is stored in the primary windings of the transformers T2 to Tn, other than the first transformer T1, with the charge converted into magnetic energy.

Thereafter, the voltage detection and drive signal generation unit 40 provides a drive signal in a low state to the switches SW2 to SWn, thus turning off the discharge switches SW2 to SWn.

Accordingly, a counter electromotive force is generated, so that the energy stored in the primary windings of the transformers T2 to Tn is transferred to the secondary windings and is converted into charge. The charge is provided to the charge storage device Bat through the semiconductor switching elements D2 to DN. In this case, the charge storage device Bat stores the charge supplied through the semiconductor switching elements D2 to Dn.

This process is continuously repeated until the voltages of the N series-connected batteries B1 to Bn are equalized.

The invention claimed is:

1. A charge equalization apparatus, comprising:
    N first transformers connected in parallel to N series-connected batteries and adapted to decrease voltages of overcharged batteries among the N batteries;
    a charge storage device for storing energy supplied from the first transformers;
    a second transformer for redistributing energy stored in the charge storage device to the N series-connected batteries; and
    a voltage detection and drive signal generation unit for detecting voltages of N respective series-connected batteries, and for generating a first drive signal, required to discharge energy from overcharged batteries, and a second drive signal, required to supply the energy stored in the charge storage device to the second transformer.

2. The charge equalization apparatus according to claim 1, further comprising:
    N discharge switches connected in series with primary windings of the N first transformers, respectively, and operated in response to the first drive signal;
    N first semiconductor switching elements connected between first ends of secondary windings of the N first transformers and an cathode of the charge storage device;
    a redistribution switch connected between a second end of a primary winding of the second transformer and a anode of the charge storage device, and operated in response to the second drive signal; and a second semiconductor switching element connected between a first end of a secondary winding of the second transformer and an cathode of a first battery of the N series-connected batteries.

3. The charge equalization apparatus according to claim 1, wherein, in each of the first transformers, a turns ratio of a primary winding to a secondary winding is N1:N2, N2 being greater than N1.

4. The charge equalization apparatus according to claim 3, wherein, in the second transformer, a turns ratio of the primary winding to the secondary winding is N2:N3, N3 being greater than N2.

5. The charge equalization apparatus according to claim 4, wherein the second transformer has a capacity larger than that of the first transformers.

6. The charge equalization apparatus according to claim 1, wherein the second end of the secondary windings of the N first transformers are connected in common to the anode of the charge storage device.

7. The charge equalization apparatus according to claim 1, wherein each of the first transformers and the second transformer is implemented such that a dot formed on a primary winding and a dot formed on a secondary winding are located at different sides.

8. The charge equalization apparatus according to claim 1, wherein each of the first transformers and the second transformer is implemented such that a dot formed on a primary winding and a dot formed on a secondary winding are located at a same side.

9. The charge equalization apparatus according to claim 1, wherein the charge storage device has a capacity proportional to a number of overcharged batteries.

10. The charge equalization apparatus according to claim 9, wherein the charge storage device is a capacitor.

11. The charge equalization apparatus according to claim 9, wherein the charge storage device is a battery for vehicles.

12. The charge equalization apparatus according to claim 2, wherein each of the first semiconductor switching elements and the second semiconductor switching element is formed of any one of a Metal Oxide Semiconductor Field Effect Transistor (MOSFET), a Bipolar Junction Transistor (BJT), a relay, and a diode.

13. The charge equalization apparatus according to claim 12, wherein each of the first semiconductor switching elements and the second semiconductor switching element is a diode.

14. The charge equalization apparatus according to claim 2, wherein each of the discharge switches and the redistribution switch is formed of any one of a MOSFET, a BJT, and a relay.

15. The charge equalization apparatus according to claim 14, wherein each of the discharge switches and the redistribution switch is an N-type MOSFET.

16. The charge equalization apparatus according to claim 1, wherein the voltage detection and drive signal generation unit comprises:

a sensing unit for detecting voltages of the N batteries;
a microprocessor for determining ON/OFF time of the discharge switches and the redistribution switch on a basis of the voltages detected by the sensing unit; and
a switch driving circuit unit for generating a first drive signal and a second drive signal, required to drive the discharge switches and the redistribution switch in response to a signal input from the microprocessor.

17. A charge equalization apparatus, comprising:
N transformers connected in parallel to N series-connected batteries, respectively, and adapted to decrease voltages of overcharged batteries among the N series-connected batteries;
a charge storage device for storing energy supplied from the transformers;
a voltage detection and drive signal generation unit for detecting voltages of N respective series-connected batteries and generating a drive signal required to discharge energy from overcharged batteries;
N discharge switches connected between primary windings of the N transformers and anodes of the N batteries, and operated in response to the drive signal; and
N semiconductor switching elements respectively connected between first ends of the secondary windings of the N transformers and an cathode of the charge storage device.

18. The charge equalization apparatus according to claim 17, wherein the secondary windings of the N transformers have second end connected to a anode of the charge storage device.

19. The charge equalization apparatus according to claim 17, wherein each of the transformers is implemented such that a dot formed on a primary winding and a dot formed on a secondary winding are located at different sides.

20. The charge equalization apparatus according to claim 17, wherein each of the transformers is implemented such that a dot formed on a primary winding and a dot formed on a secondary winding are located at a same side.

21. The charge equalization apparatus according to claim 17, wherein the charge storage device is a battery for vehicles.

22. The charge equalization apparatus according to claim 17, wherein the charge storage device is a capacitor.

23. The charge equalization apparatus according to claim 17, wherein each of the discharge switches is formed of a MOSFET, a BJT, and a relay.

24. The charge equalization apparatus according to claim 23, wherein each of the discharge switches is an N-type MOSFET.

25. The charge equalization apparatus according to claim 17, wherein each of the semiconductor switching elements is formed of any one of a MOSFET, a BJT, a relay, and a diode.

26. The charge equalization apparatus according to claim 25, wherein each of the semiconductor switching elements is a diode.

* * * * *